(12) United States Patent
Nishizawa et al.

(10) Patent No.: US 7,421,309 B2
(45) Date of Patent: Sep. 2, 2008

(54) CONTROL DEVICE OF INJECTION MOLDING MACHINE

(75) Inventors: Makoto Nishizawa, Numazu (JP); Yutaka Yamaguchi, Tagata-gun (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/410,854

(22) Filed: Apr. 26, 2006

(65) Prior Publication Data

US 2006/0247821 A1 Nov. 2, 2006

(30) Foreign Application Priority Data

Apr. 28, 2005 (JP) .............................. 2005-133162
Apr. 28, 2005 (JP) .............................. 2005-133163

(51) Int. Cl.
*B29C 45/00* (2006.01)
(52) U.S. Cl. ..................................... 700/200; 264/40.1
(58) Field of Classification Search ......... 700/200–205; 264/40.1
See application file for complete search history.

(56) References Cited

U.S. PATENT DOCUMENTS

| | | | | |
|---|---|---|---|---|
| 5,296,179 A | * | 3/1994 | Kamiguchi et al. ......... | 264/40.1 |
| 5,470,218 A | * | 11/1995 | Hillman et al. ............. | 425/144 |
| 5,611,975 A | * | 3/1997 | Kamiguchi et al. ......... | 264/40.1 |
| 5,733,486 A | * | 3/1998 | Hayasi et al. ............... | 264/40.1 |
| 5,783,221 A | * | 7/1998 | Takizawa et al. ............ | 425/143 |
| 5,870,698 A | * | 2/1999 | Riedel et al. ................ | 702/182 |
| 6,015,515 A | * | 1/2000 | Fujita ........................ | 264/40.1 |
| 6,066,276 A | * | 5/2000 | Kamiguchi et al. ......... | 264/40.7 |
| 6,073,059 A | | 6/2000 | Hayashi et al. | |
| 6,325,954 B1 | * | 12/2001 | Sasaki et al. ................ | 264/40.1 |
| 6,381,512 B1 | * | 4/2002 | Saitou et al. ................ | 700/200 |
| 6,618,041 B2 | * | 9/2003 | Nishizawa .................. | 345/173 |
| 6,925,354 B2 | | 8/2005 | Mörwald et al. | |
| 6,931,300 B2 | * | 8/2005 | Yamazaki et al. ........... | 700/200 |
| 2004/0186607 A1 | * | 9/2004 | Yoshinaga et al. .......... | 700/109 |
| 2006/0157880 A1 | | 7/2006 | Hehl | |
| 2007/0007683 A1 | * | 1/2007 | Amano ...................... | 264/40.1 |

FOREIGN PATENT DOCUMENTS

| | | |
|---|---|---|
| DE | 10246925 A1 | 4/2003 |
| DE | 10334153 A1 | 2/2005 |
| EP | 1306188 A1 | 5/2003 |
| JP | 2001-191383 | 7/2001 |

OTHER PUBLICATIONS

German Office Action issued in counterpart DE Patent Application No. 10 2006 019 598.1-51 on Oct. 16, 2007.

(Continued)

*Primary Examiner*—Zoila E Cabrera
(74) *Attorney, Agent, or Firm*—DLA Piper US LLP

(57) ABSTRACT

A plurality of condition setting screens necessary to set various operation conditions of an injection molding machine is switched and displayed on a touch-panel-equipped display unit of a human-machine interface.

6 Claims, 8 Drawing Sheets

OTHER PUBLICATIONS

English Translation of German Office Action issued in counterpart DE Patent Application No. 10 2006 019 598.1-51 on Oct. 16, 2007.
English Abstract for DE Patent Publication No. DE10334153.
English Abstract for DE Patent Publication No. DE10246925.

Office Action (in German) issued on Oct. 16, 2007, in counterpart German Patent Application No. 10 2006 019 684.8-51.
English Translation of Office Action issued on Oct. 16, 2007, in counterpart German Patent Application No. 10 2006 019 684.8-51.

* cited by examiner

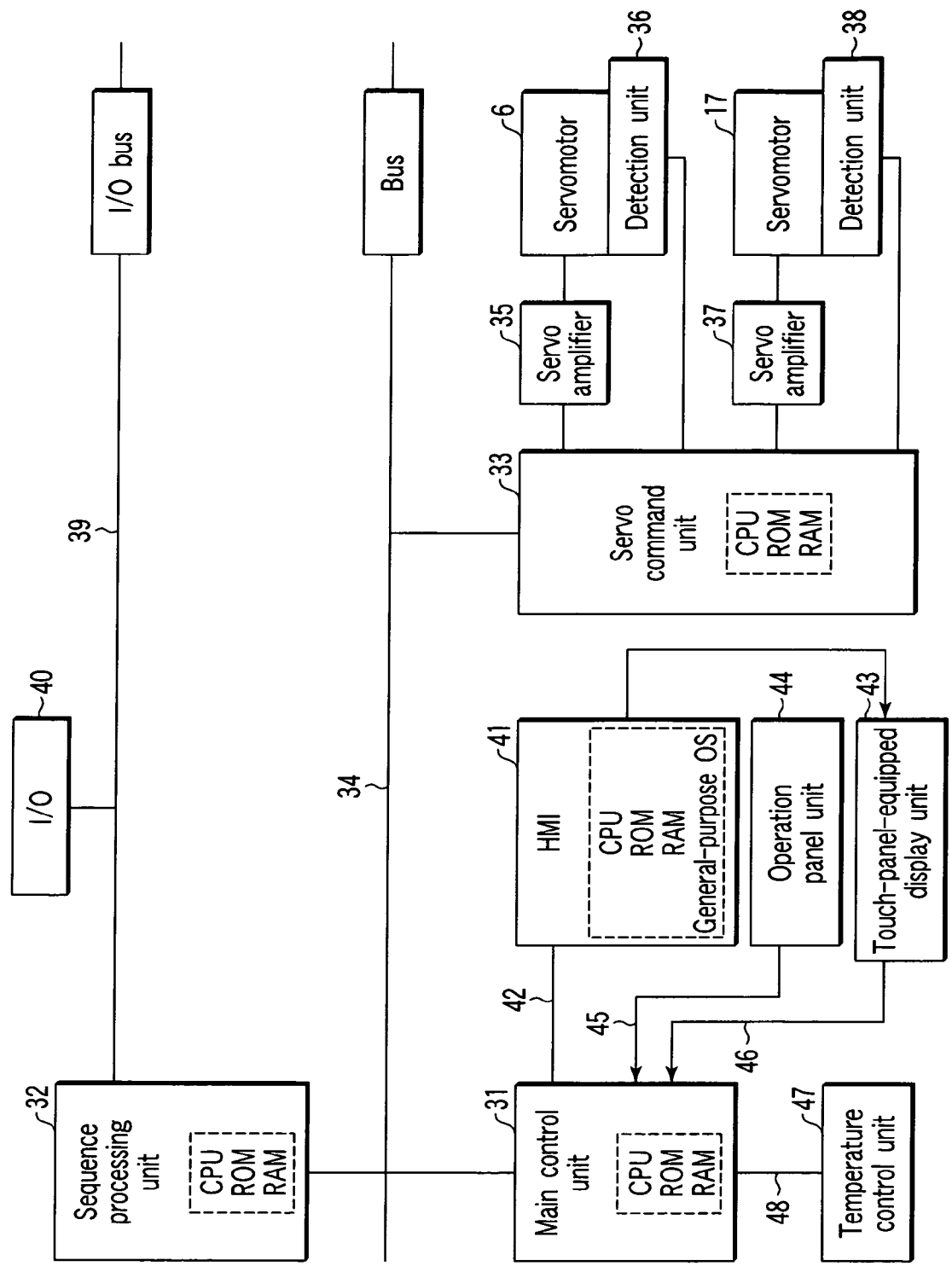
F I G. 2

CONTROL DEVICE OF INJECTION MOLDING MACHINE

CROSS-REFERENCE TO RELATED APPLICATIONS

This application is based upon and claims the benefit of priority from prior Japanese Patent Applications No. 2005-133162, filed Apr. 28, 2005; and No. 2005-133163, filed Apr. 28, 2005, the entire contents of both of which are incorporated herein by reference.

BACKGROUND OF THE INVENTION

1. Field of the Invention

This invention relates to a control device of an injection molding machine which heats and melts a resin material and injects the molten resin into a mold while measuring the molten resin in order to manufacture a molded article.

2. Description of the Related Art

In an injection molding machine, a synthetic resin material put from a hopper into a barrel is melted by heating with a heater, and the molten resin is extruded forward by the rotation and forward movement of an injection screw provided in the barrel, and then the extruded resin is injected from an injection nozzle into a mold while being measured in the barrel. The injected resin is filled in the mold. Subsequently, the mold is separated from the injection nozzle. Then, a molded article is taken from the mold.

Such an injection molding machine is equipped with a control device, and the control device is provided with a so-called human-machine interface as operation display means. Various operation conditions of the injection molding machine can be set by the operation of the human-machine interface.

In an actual process, the conditions of the various operations may be sequentially changed and set in light of how an injection-molded article has been finished. In this case, it takes time for a person in charge to operate the injection molding machine, thus requiring time and trouble for the operation.

BRIEF SUMMARY OF THE INVENTION

One aspect of this invention is directed to provide a control device of an injection molding machine which allows various operation conditions to be easily and rapidly changed and set so that a burden imposed on a person in charge can be significantly reduced.

A control device of an injection molding machine in the one aspect of this invention comprises:

a human-machine interface which has a display unit and takes in as input information an operation and input performed on the display unit; and a control section which switches and displays, on the display unit of the human-machine interface, a plurality of condition setting screens necessary to set various operation conditions of the injection molding machine.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram of a control device in the embodiment;

FIG. 6 is a diagram showing a state where a setter screen is displayed in the condition setting screen of FIG. 5;

FIG. 9 is a diagram showing a state where the history screen is displayed in nearly the whole area of the condition setting screen of FIG. 5.

DETAILED DESCRIPTION OF THE INVENTION

One embodiment of this invention will hereinafter be described with reference to the drawings.

Figure 1:
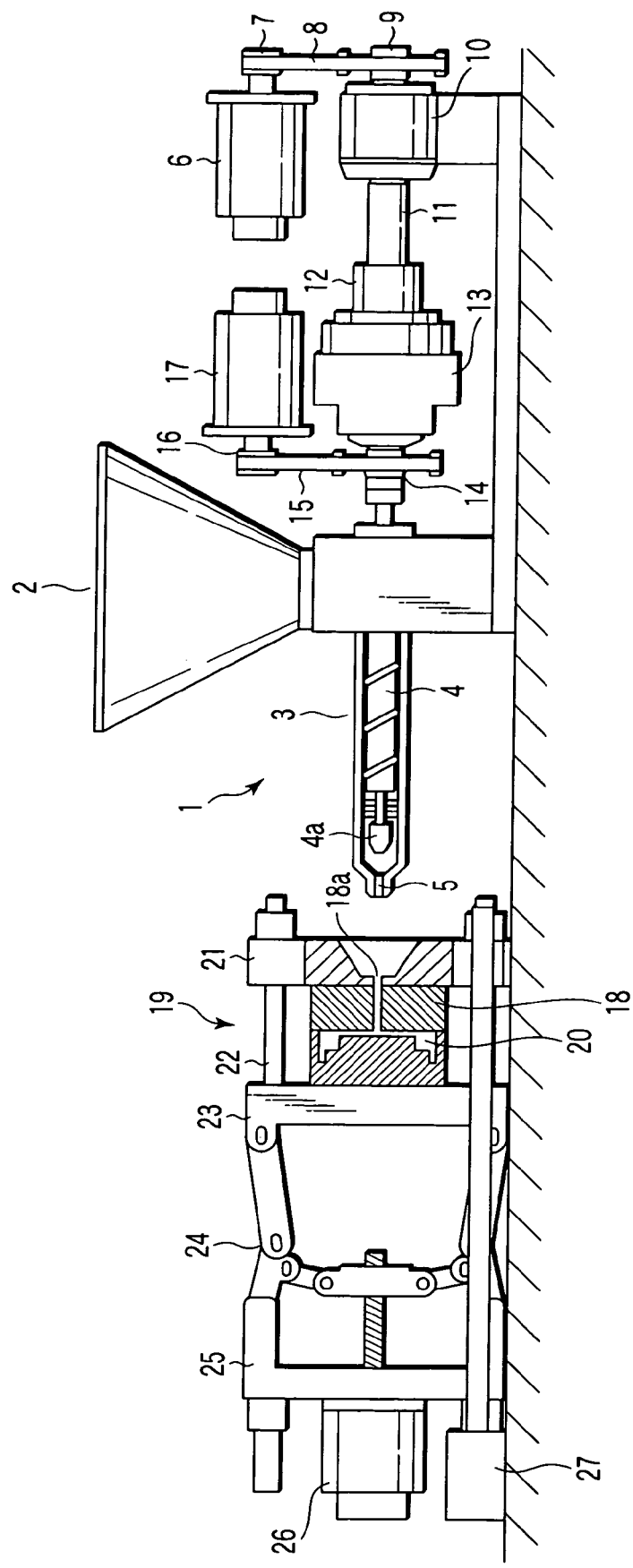
FIG. 1 is a diagram showing the configuration of an injection molding machine in one embodiment of this invention.

FIG. 1 shows the configuration of an electrically driven injection molding machine. An injection molding machine main body 1 comprises a cylindrical barrel 3 having a hopper 2. In this barrel 3, an injection screw 4 is inserted in a rotatable manner and in a manner to freely move back and forth. The hopper 2 is provided in the rear of the barrel 3, and a synthetic resin material is put into the hopper 2. The synthetic resin material put therein flows into the barrel 3.

A plurality of heaters (not shown) is provided at predetermined intervals on the outer periphery of the barrel 3. These heaters heat the outer periphery of the barrel 3. This heating melts the synthetic resin material put in from the hopper 2. An injection nozzle 5 to inject the molten resin is formed at the tip of the barrel 3. The temperature of the barrel 3 is controlled so that the melting degree of the molten resin may become gradually higher toward the tip of the barrel 3.

The injection screw 4 is powered by an injection servomotor 6 to rotate and move back and forth. That is, the rotary drive force of the injection servomotor 6 is transmitted to a ball screw shaft 11 rotatably provided in a servo bracket 10 via a transmission mechanism composed of a pulley 7, a timing belt 8 and a timing pulley 9. Further, a ball nut 12 is screwed in the ball screw shaft 11, and the ball nut 12 is coupled to a thrust box 13. Moreover, a rear end of the injection screw 4 is rotatably coupled to the thrust box 13 via an S-shaft and a bearing.

A timing pulley 14 is provided to the S-shaft rotatably coupled to the thrust box 13. A measurement servomotor 17 is linked to the timing pulley 14 via a transmission mechanism composed of a timing belt 15 and a pulley 16. Owing to this configuration, the rotary drive force of the measurement servomotor 17 is transmitted to the S-shaft. The rotation of the measurement servomotor 17 is transmitted to the injection screw 4 as the rotation to perform a measurement operation.

In front of the barrel 3, there are arranged a mold 18, and a device 19 which causes the mold 18 to open/close and clamp. A tip 4a of the injection screw 4 presses the injection nozzle 5 formed at the tip of the barrel 3 against a nozzle opening 18a of the mold 18 to bring them into contact. At this moment, the resin melted in the barrel 3 is injected from the injection nozzle 5. The injected resin is filled into a mold cavity 20.

The mold 18 is supported between a fixed plate 21 and a moving plate 23. A tie bar 22 is inserted through the fixed plate 21, and the moving plate 23 is linked to the tip of the tie bar 22. Further, a toggle mechanism support plate 25 is linked to the moving plate 23 via a toggle-type clamping mechanism 24. A clamping servomotor 26 to drive the toggle-type clamping mechanism 24 is linked to the toggle mechanism support plate 25. 27 denotes a mold thickness adjustment mechanism which adjusts a mold thickness produced by the toggle-type clamping mechanism 24.

In this electrically driven injection molding machine 1, the clamping servomotor 26 is first actuated to start closing the mold 18, and the injection nozzle 5 of the barrel 3 is pressed against the nozzle opening 18a of the mold 18 to bring them into contact. Next, the measurement servomotor 17 is actuated to measure the resin to be injected, and then the injection servomotor 6 is actuated to move the injection screw 4 forward. Thus, the measured resin is injected and filled into the mold cavity 20.

A control device of such an injection molding machine 1 is shown in FIG. 2.

A main control unit 31 has a CPU, a ROM and a RAM, and manages and monitors the main body of the injection molding machine 1. A sequence processing unit 32 has a CPU, a ROM and a RAM, and controls the operational sequence of the injection molding machine main body. A servo command unit 33 has a CPU, a ROM and a RAM, and controls the injection servomotor 6 and the measurement servomotor 17. The main control unit 31, the sequence processing unit 32 and the servo command unit 33 are connected to each other by a bus line 34.

The servo command unit 33 drives the injection servomotor 6 under the control of a servo amplifier 35. The rotation and current value of the injection servomotor 6 are detected by a detection unit 36. The servo command unit 33 takes in a detection signal of the detection unit 36 to detect the movement position of the injection screw 4, the rotation speed of the injection screw 4, the current value of the injection servomotor 6, etc. On the basis of the detection results, the servo command unit 33 performs feedback control of the injection servomotor 6.

The servo command unit 33 drives the measurement servomotor 17 under the control of a servo amplifier 37. The rotation and current value of the measurement servomotor 17 are detected by a detection unit 38. The servo command unit 33 takes in a detection signal of the detection unit 38 to detect the movement position of the injection screw 4, the rotation speed of the injection screw 4, the current value of the measurement servomotor 17, etc. On the basis of the detection results, the servo command unit 33 performs feedback control of the measurement servomotor 17.

An I/O 40 and the like are connected to the sequence processing unit 32 via an I/O bus 39.

The main control unit 31 comprises a communication interface. A human-machine interface (HMI) 41 having a CPU, a ROM, a RAM and a general-purpose operating system (OS) is connected to the communication interface via a LAN 42. The human-machine interface 41 comprises, for example, a personal computer, to which a touch-panel-equipped display unit 43 and an operation panel unit 44 are attached. The human-machine interface 41 takes in as input information an operation and input performed on a screen of the touch-panel-equipped display unit 43, and various operations of the human-machine interface 41 including the intake of the input information are controlled by the main control unit 31.

The operation panel unit 44 is connected to the main control unit 31 by a cable 45. A touch panel of the touch-panel-equipped display unit 43 is connected to the main control unit 31 by a cable 46. Further, a temperature control unit 47 is connected to the main control unit 31. The temperature control unit 47 controls the temperature of the barrel 3 heated by the heaters arranged on the outer periphery of the barrel 3.

Figure 3:
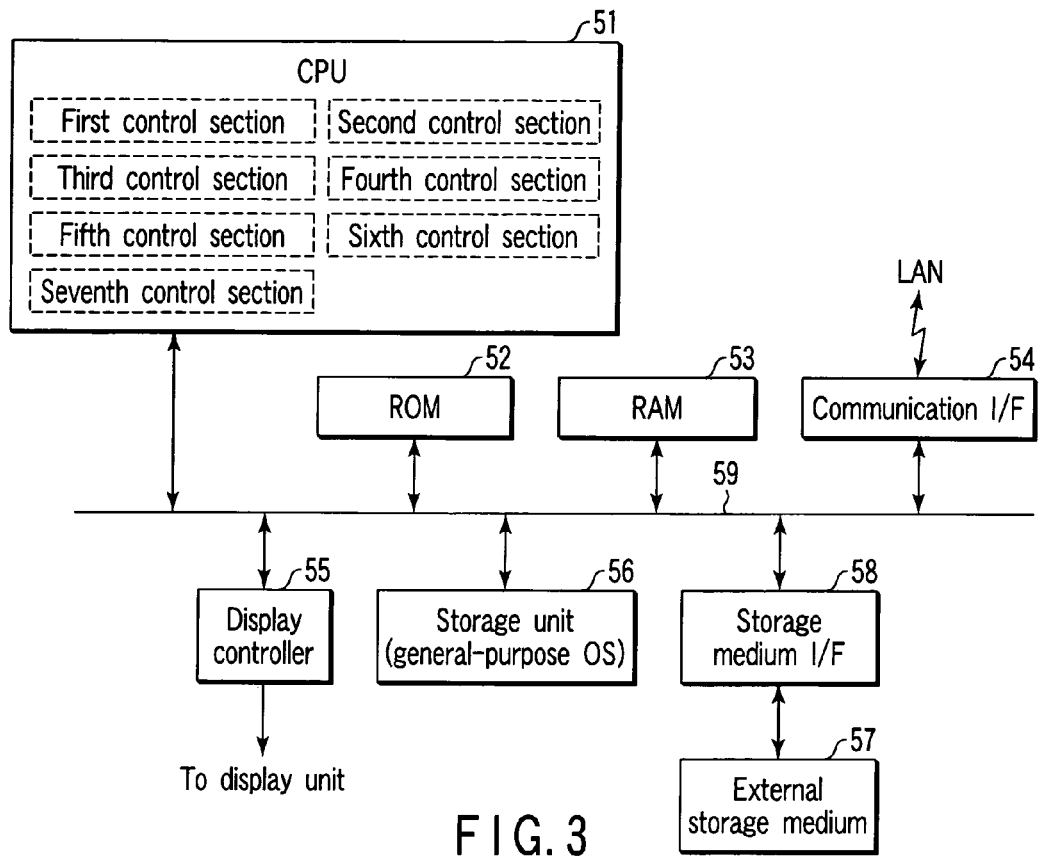
FIG. 3 is a block diagram of a human-machine interface in the embodiment.

As shown in FIG. 3, the human-machine interface 41 comprises a CPU 51, a ROM 52 storing program data, a RAM 53 for data processing, and a communication interface (I/F) 54 which communicates with the main control unit 31 via the LAN 42, a display controller 55 which controls the display of the touch-panel-equipped display unit 43, a storage unit 56 storing the general-purpose OS and the like for which a non-volatile storage medium such as a memory card or a hard disk is used, a storage medium interface (I/F) 58 which performs data communication with an external storage medium 57 such as an optical disk, and a bus line 59 for data transmission.

Input signals from the touch-panel-equipped display unit 43 are supplied to the main control unit 31. The main control unit 31 transmits, to the human-machine interface 41 via the LAN 42, a signal necessary in the human-machine interface 41 among the input signals from the touch-panel-equipped display unit 43.

Figure 4:
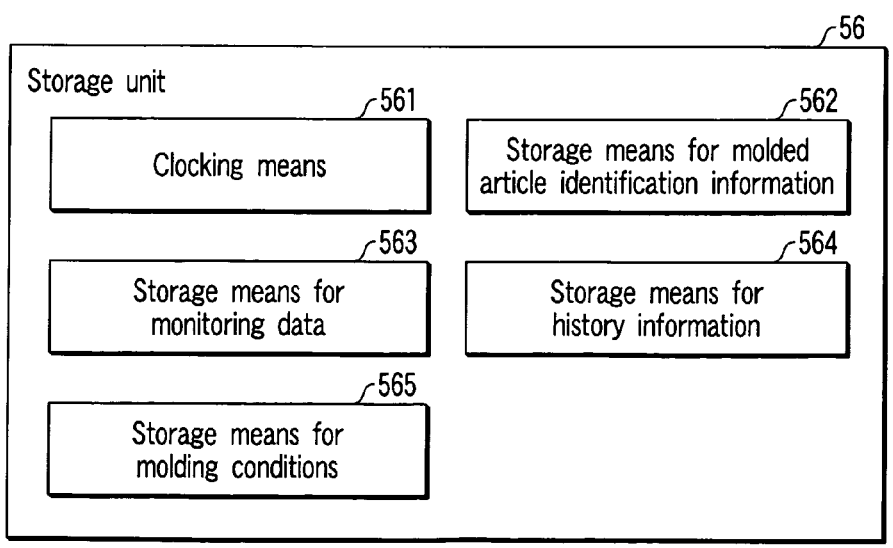
FIG. 4 is a diagram showing the internal configuration of a storage unit in the embodiment.

As shown in FIG. 4, the storage unit 56 has clocking means 561, storage means 562 for molded article identification information, storage means 563 for monitoring data, storage means 564 for history information, storage means 565 for molding conditions, etc.

Furthermore, the CPU 51 of the human-machine interface 41 comprises the following (1) to (7) as the main functions.

(1) A first control section. The first control section switches and displays, on the touch-panel-equipped display unit 43 of the human-machine interface 41, a number of condition setting screens necessary to set various operation conditions of the injection molding machine. It is to be noted that each of the condition setting screens includes a plurality of condition item patterns corresponding to the various operation conditions.

(2) A second control section. When one of the condition item patterns in the condition setting screen displayed in the touch-panel-equipped display unit 43 is specified/operated, the second control section pop-up-displays, over the condition setting screen displayed in the touch-panel-equipped display unit 43, a setter screen to set data on the operation conditions corresponding to the specified/operated condition item pattern.

(3) A third control section. When the setter screen is displayed on the touch-panel-equipped display unit 43, the third control section displays a history screen showing the history of operations performed on the displayed setter screen, in an area different from a display area of that setter screen.

(4) A fourth control section. The fourth control section arranges and displays, in a predetermined area of the touch-panel-equipped display unit 43, a plurality of informing patterns to inform of the operation conditions set in the condition setting screens in order of time in which those informing patterns are set.

(5) A fifth control section. When one of the informing patterns is specified/operated, the fifth control section pop-up-displays, over the condition setting screen displayed in the touch-panel-equipped display unit 43, a setter screen to set data on the operation conditions corresponding to the specified/operated informing pattern.

(6) A sixth control section. When the setter screen is displayed on the touch-panel-equipped display unit 43, the sixth control section displays a history screen showing the history of operations performed on the displayed setter screen, in an area different from a display area of that setter screen.

(7) A seventh control section. The seventh control section displays the history information concerning all the operations on the human-machine interface 41 in nearly the whole area of the screen of the touch-panel-equipped display unit 43.

Next, effects will be described.

Figure 5:
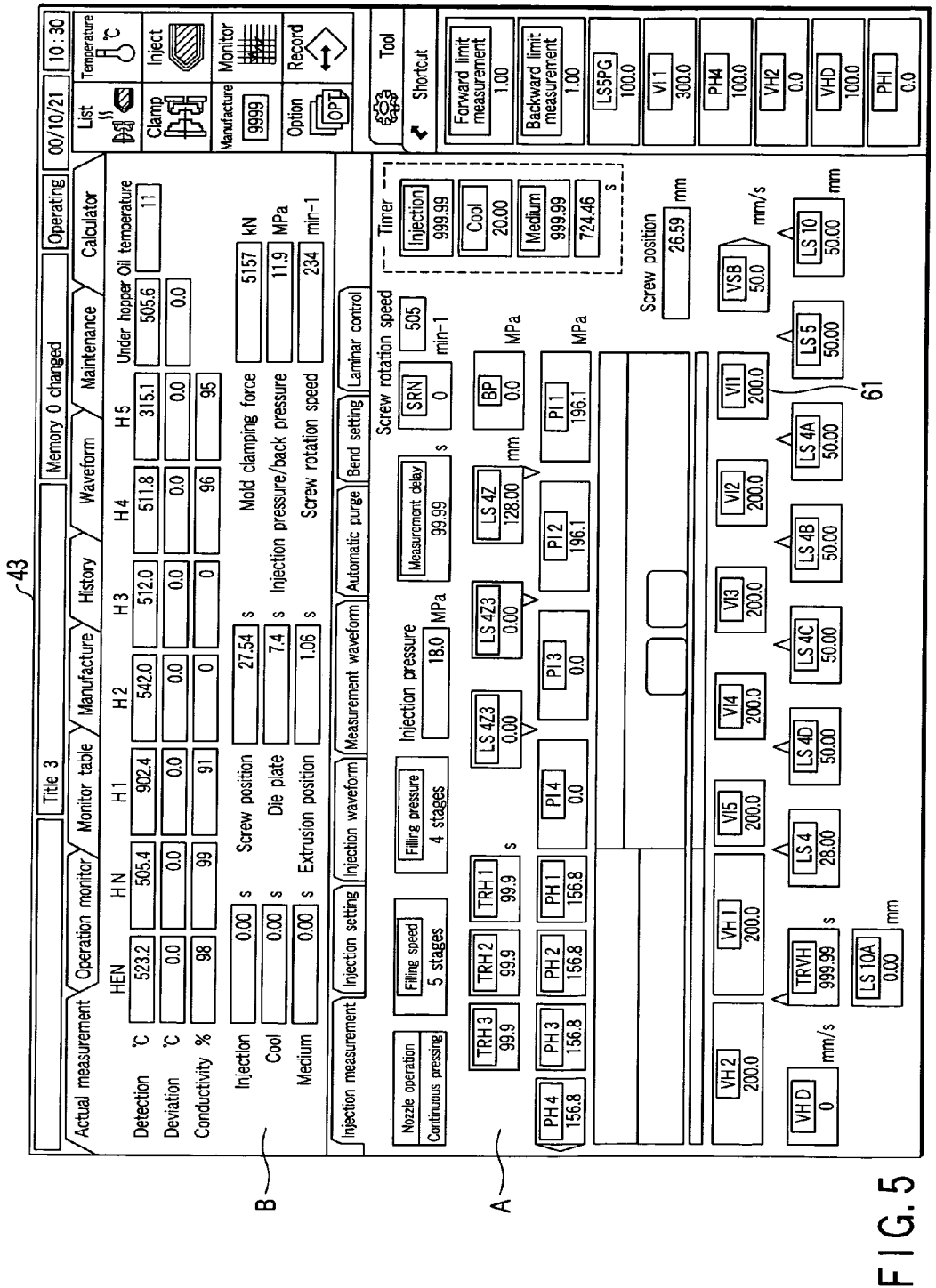
FIG. 5 is a diagram showing a condition setting screen displayed on a display unit of the human-machine interface in the embodiment.

As shown in FIG. 5, a number of condition setting screens necessary to set the various operation conditions of the injection molding machine 1 are displayed on the touch-panel-equipped display unit 43 of the human-machine interface 41. Tabs are affixed to the respective condition setting screens, and one of the tabs is specified/operated by a cursor or by touching such that the condition setting screen having the specified/operated tab is displayed at the forefront of the touch-panel-equipped display unit 43. In a state shown in FIG. 5, the condition setting screen concerning injection measurement is displayed as a main screen A, above which a subscreen B for actual measurement is displayed.

Thus, one of a number of condition setting screens can be switched to and displayed on the touch-panel-equipped display unit 43, such that it is possible to easily and rapidly change and set the necessary operation conditions. Thus, a burden imposed on a person in charge can be significantly reduced.

Figure 6:
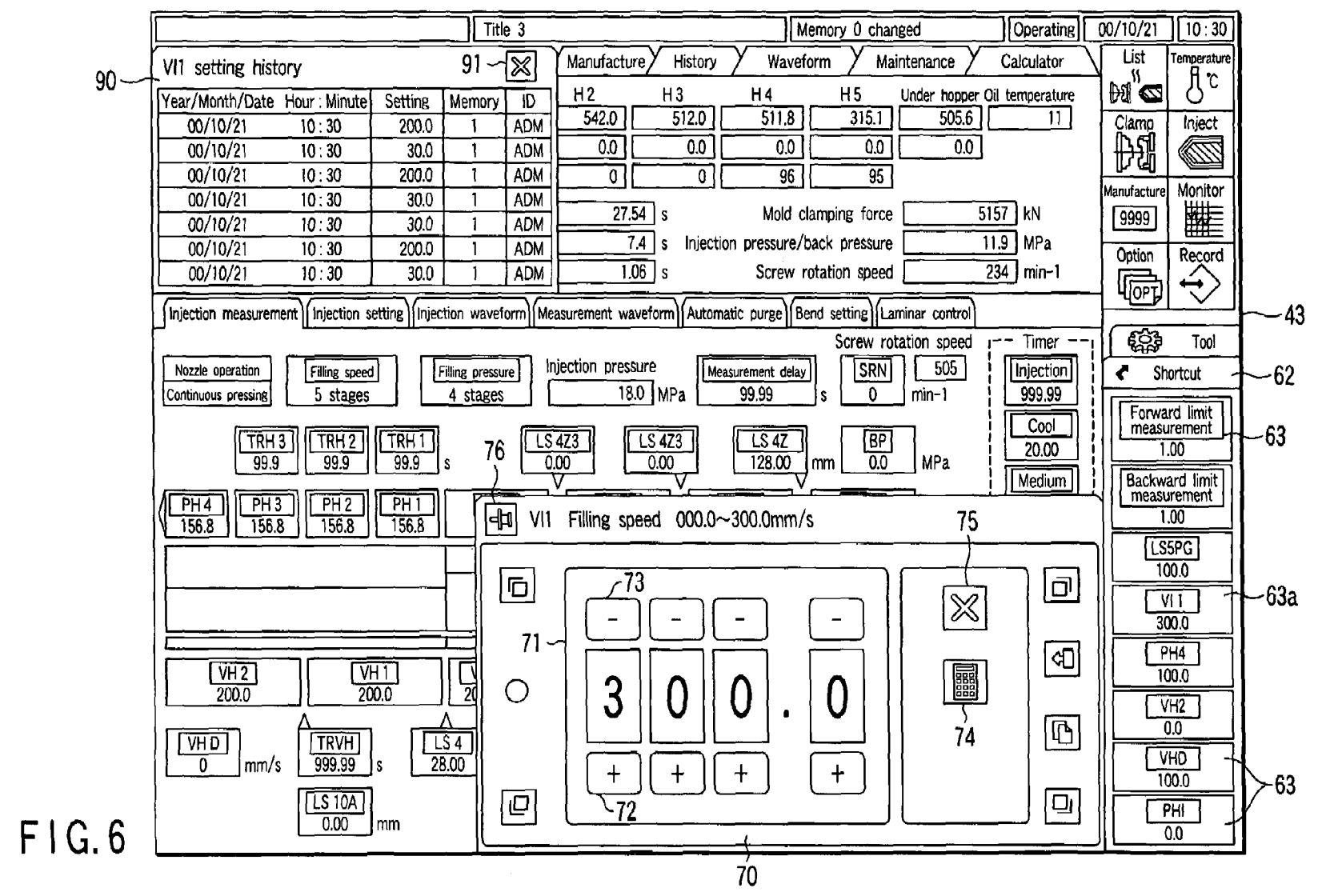

Furthermore, when the condition setting screen concerning the injection measurement is displayed, for example, a "VI1" condition item pattern 61 (shown in FIG. 5) is specified/operated by a cursor or by touching, such that a setter screen 70 to set data on an operation condition "VI1 filling speed" corresponding to the "VI1" condition item pattern 61 is pop-up-displayed over the condition setting screen as shown in FIG. 6.

Figure 7:
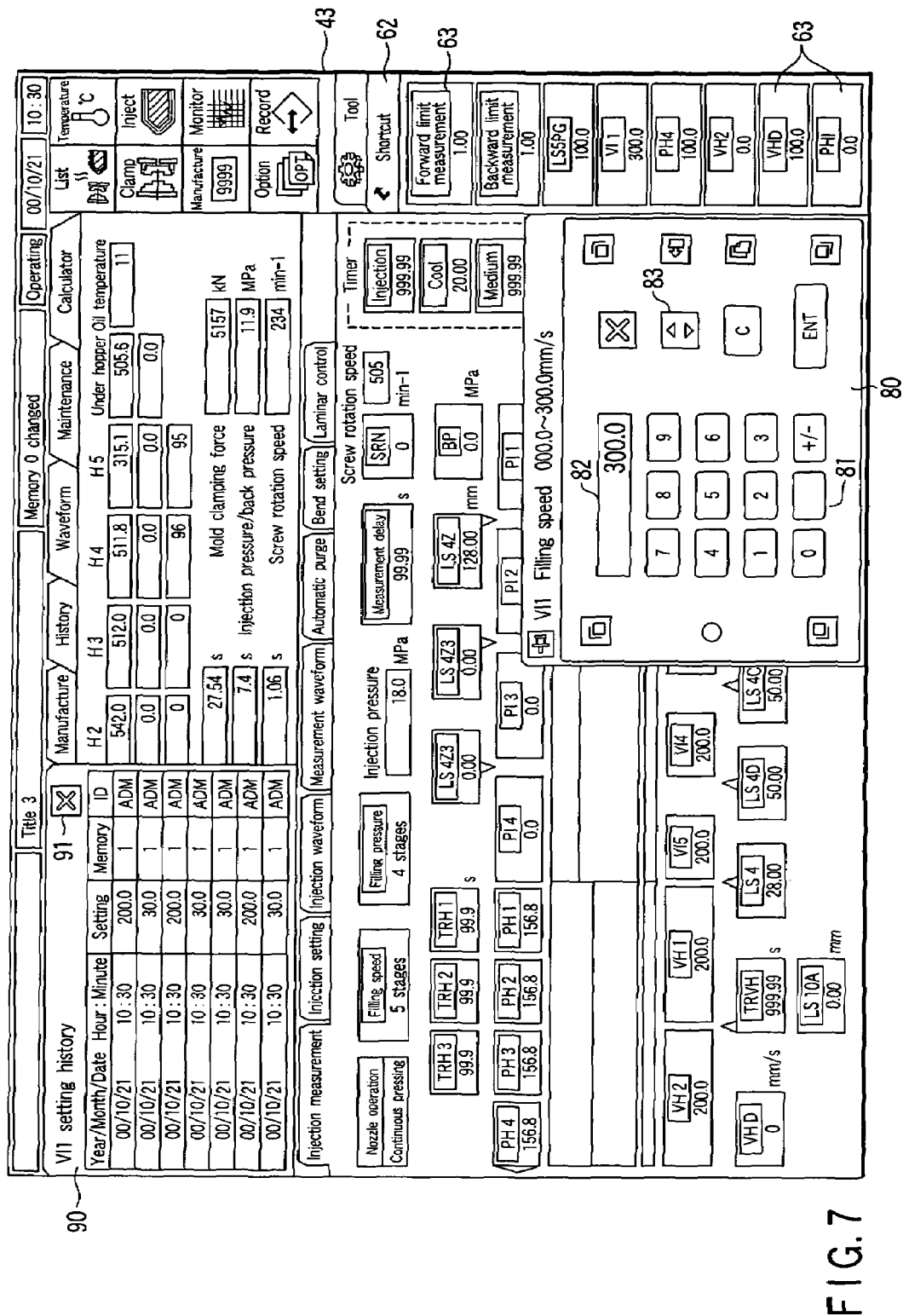
FIG. 7 is a diagram showing a state where a numeric keypad screen is displayed in the condition setting screen of FIG. 5.

The setter screen 70 has a numerical value display window 71 with a plurality of digits in nearly the center thereof, and + buttons 72 for numerical value increase setting and − buttons 73 for numerical value decrease setting are provided at upper and lower positions in the numerical value display window 71. If the + buttons 72 and the − buttons 73 are specified/operated by a cursor or by touching, the numerical value of the "VI1 filling speed" can be fine-tuned. Moreover, a numeric keypad switch button 74 is provided in a right area of the setter screen 70. If this numeric keypad switch button 74 is specified/operated by a cursor or by touching, a numeric keypad screen 80 is displayed in place of the setter screen 70, as shown in FIG. 7.

The numeric keypad screen 80 has numeric keypad buttons 81 in nearly the center thereof, and a numerical value display window 82 is provided above the numeric keypad buttons 81. If the numeric keypad buttons 81 are specified/operated by a cursor or by touching, the numerical value of the "VI1 filling speed" can be freely set. Further, an up-down button 83 is provided in a right area of the numeric keypad screen 80. If this up-down button 83 is specified/operated by a cursor or by touching, there comes back the display of the setter screen 70 in FIG. 6.

It is to be noted that the setter screen 70 further comprises a cancel button 75 and a stopper pin button 76. If the cancel button 75 is operated, the pop-up display of the setter screen 70 is cancelled.

Furthermore, a shortcut screen 62 is displayed in a predetermined area, for example, a lower right area of the condition setting screen displayed on the touch-panel-equipped display unit 43. In the shortcut screen 62, there are arranged and displayed, as a so-called setting history, eight informing patterns 63 to particularly inform of, for example, eight contents which have been recently set among contents set in the condition setting screens, in order of time in which those informing patterns are set. The lowermost informing pattern 63 is the latest one, and the higher ones are older. When the stopper pin button 76 of the corresponding setter screen 70 is operated, each of the informing pattern 63 is locked on the shortcut screen 62. It is to be noted that setting contents of the condition setting screens are stored in the storage means 565 for molding conditions in the storage unit 56.

If one of the eight informing patterns 63 is specified/operated by a cursor or by touching, the setter screen 70 to set data on the operation conditions corresponding to the specified/operated informing pattern 63 is pop-up-displayed. For example, as shown in FIG. 6, if an informing pattern 63a indicating that the "VI1 filling speed" has been set is specified/operated by a cursor or by touching, the setter screen 70 to set data on the "VI1 filling speed" is pop-up-displayed.

Therefore, when the various operation conditions are changed and set while checking how an injection-molded article has been finished, the person in charge may specify/operate, by a cursor or by touching, the informing pattern 63 corresponding to the operation conditions which need to be changed and set among the informing patterns 63 displayed in the shortcut screen 62, in order to pop-up-display the setter screen 70 to set data on the operation conditions which need to be changed and set. Thus, it is possible to easily and rapidly change and set the various operation conditions without requiring a troublesome operation of finding the necessary condition setting screen from a number of condition setting screens and resetting it while switching the display. This allows a significant reduction of the burden imposed on the person in charge.

On the other hand, in the touch-panel-equipped display unit 43, a history screen 90 is displayed in an area different from the area where the setter screen 70 is displayed, for example, at a position diagonal to the setter screen 70, as shown in FIG. 6. The history screen 90 shows the history of operations performed on the setter screen 70 being displayed, and comprises "date and time of operation", "setting contents", "identification information on storing memory", "ID of operator", etc. The lowermost step is the latest one, and the higher ones are older.

The history information is stored in the history information storage means 564 in the storage unit 56. Moreover, the history screen 90 comprises a cancel button 91. If the cancel button 91 is operated, the pop-up display of the history screen 90 is cancelled.

Owing to this history screen 90, when new conditions are set by use of the setter screen 70, the operation history corresponding to that setter screen 70 can be properly displayed without requiring troublesome searching and screen operations. This allows easy and rapid condition setting referring to the history.

Figure 8:
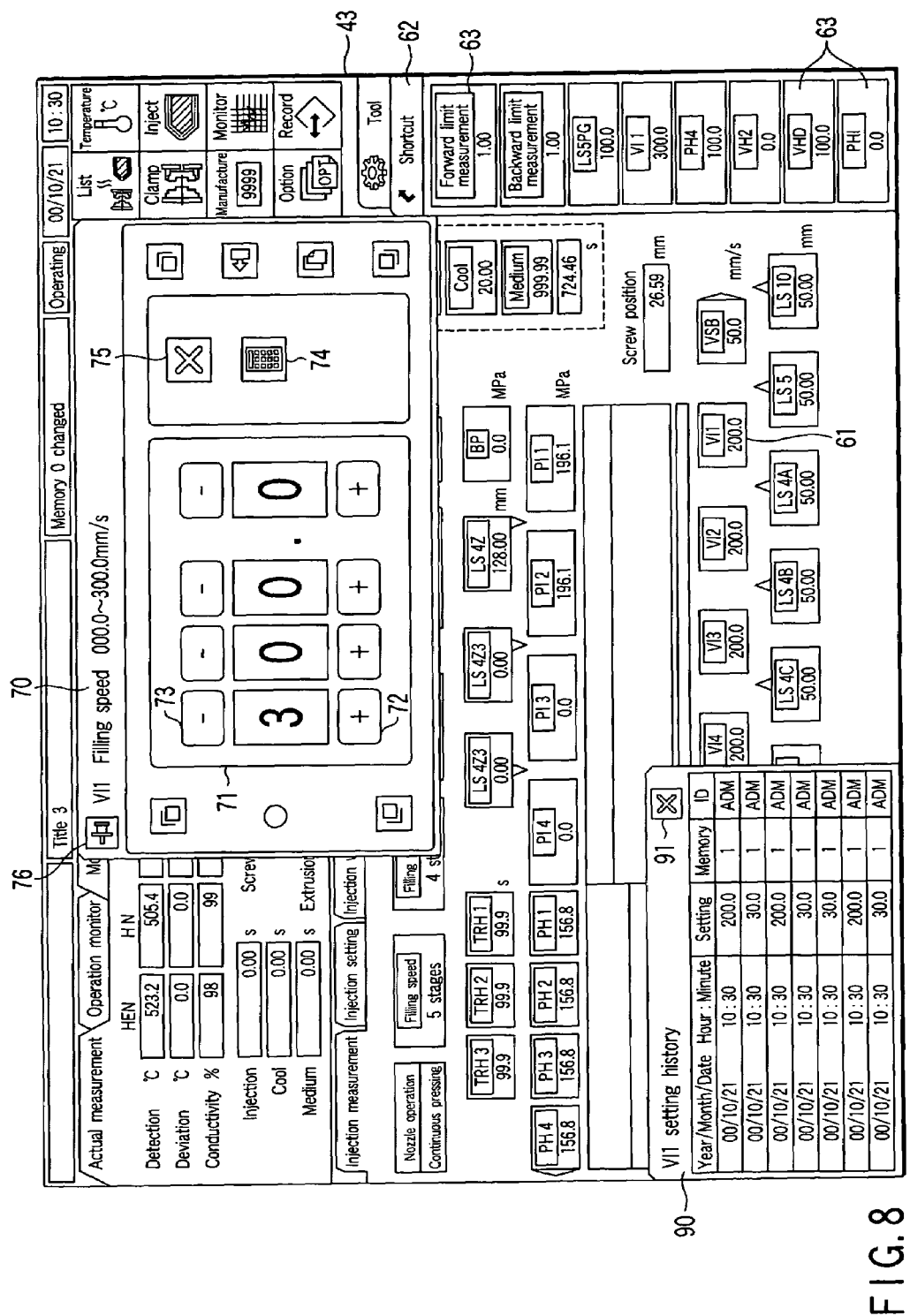
FIG. 8 is a diagram showing a state where the setter screen and a history screen are displayed in the condition setting screen of FIG. 5.

The display position of the setter screen 70 in the touch-panel-equipped display unit 43 can be moved, for example, to an upper right area by cursor operation as shown in FIG. 8. In this case, the history screen 90 moves to a lower left area located diagonally to the setter screen 70.

Figure 9:
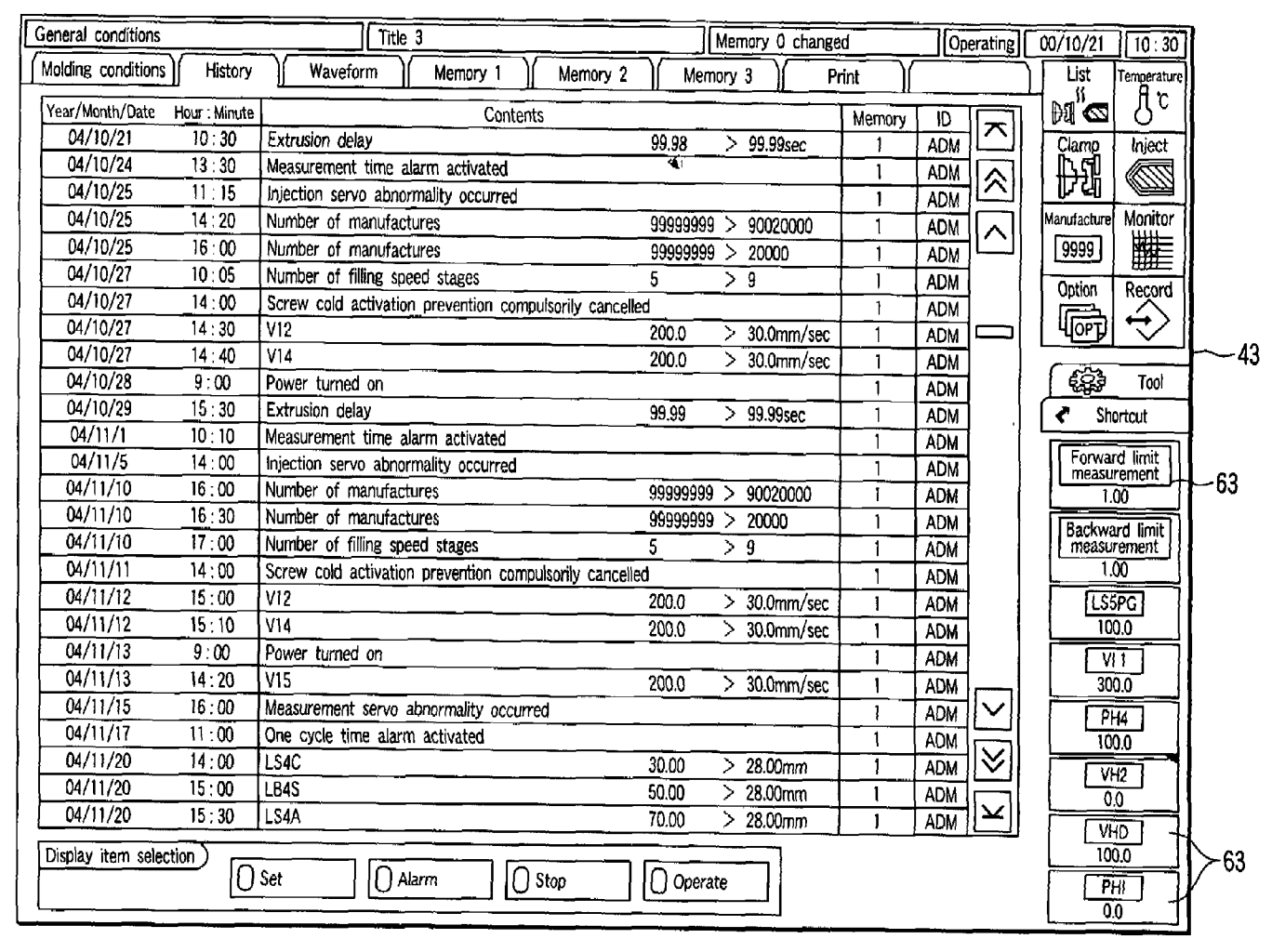

It is to be noted that the history information includes not only the history information concerning the individual operations of the setter screens 70 but also the history information concerning all the operations of the human-machine interface 41. The history information concerning all the operations of the human-machine interface 41 is displayed in the whole area of the screen of the touch-panel-equipped display unit 43 as shown in FIG. 9 by a particular operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A control device of an injection molding machine which melts a resin material by heating and injects the molten resin into a mold to manufacture a molded article, the control device comprising:
   a human-machine interface which has a display unit and takes in as input information an operation and data input only on the display unit;
   a first control section which switches and displays, on the display unit of the human-machine interface, a plurality of condition setting screens necessary to set various operation conditions of the injection molding machine, each of the plurality of condition setting screens displaying a plurality of condition item patterns which correspond to the various operation conditions;
   a second control section, wherein when one of the condition item patterns is specified/operated, the second control section pop-up-displays, over the condition setting screen displayed in the display unit, a setter screen to set data of the operation conditions corresponding to the specified/operated condition item pattern;
   a third control section, wherein when the setter screen is displayed on the display unit, third control section displays a history screen showing the history of operations performed only on the displayed setter screen, in an area different from a display area of the setter screen;
   a fourth control section which arranges and displays, in a predetermined area of the display unit, a plurality of informing patterns to inform of the operation conditions set in the at least one of a plurality of condition setting screens in an order of time in which each of the informing patterns are set; and
   a fifth control section, wherein when at least one of the plurality of informing patterns is specified/operated, the fifth control section pop-up-displays, over the condition setting screen displayed in the display unit, the setter screen to set data on the operation conditions corresponding to the specified/operated informing pattern, wherein
   the setter screen comprises a cancel button for canceling the pop-up display on the setter screen, and a stopper pin button for locking the information patterns on the condition setting screen.

2. The device according to claim 1, further comprising:
   a control section which displays the history information concerning all the operations on the human-machine interface in nearly the whole area of the screen of the display unit.

3. The device according to claim 1, wherein:
   the injection molding machine, melts the resin material by heating, and injects the molten resin into the mold while measuring the molten resin to manufacture the molded article.

4. A control device of an injection molding machine which, melts a resin material by heating and injects the molten resin into a mold to manufacture a molded article, the control device comprising:
   a human-machine interface which has a display unit and takes in as input information an operation and data input only on the display unit;
   first control means for switching and displaying, on the display unit of the human-machine interface; a plurality of condition setting screens necessary to set various operation conditions of the injection molding machine, each of the plurality of condition setting screens displaying a plurality of condition item patterns which correspond to the various operation conditions;
   second control means, wherein when the of the condition item patterns is specified/operated, the second control means pop-up-displays, over the condition setting screen displayed in the display unit, a setter screen to set data of the operation conditions corresponding to the specified/operated condition item pattern;
   a third control means, wherein when the setter screen is displayed on the display unit, the third control means displays a history screen showing the history of operations performed only on the displayed setter screen, in an area different from a display area of the setter screen;
   a fourth control means for arranging and displaying, in a predetermined area of the display unit, a plurality of informing patterns to inform of the, operation conditions set in the at least one of a plurality of condition setting screens in an order of time in which each of the informing patterns are set; and
   a fifth control means, wherein when at least one of the plurality of informing patterns is specified/operated, the fifth control means pop-up-displays, over the condition setting screen displayed in the display unit, the setter screen to set data on the operation conditions corresponding to the specified/operated informing pattern, wherein
   the setter screen comprises a cancel button for canceling the, pop-up display on the setter screen, and a stopper pin button for locking the information patterns on the condition setting screen.

5. The device according to claim 4, further comprising:
   control means for displaying the history information concerning all the operations on the human machine interface in nearly the whole area of the screen of the display unit.

6. The device according to claim 4, wherein:
   the injection molding machine melts the resin material by heating, and injects the, molten resin into the mold while measuring the molten resin to manufacture the molded article.

* * * * *